United States Patent
Presler-Marshall et al.

(10) Patent No.: US 9,253,327 B2
(45) Date of Patent: Feb. 2, 2016

(54) UNIFIED COMMUNICATIONS USING CALLED PARTY LOCATION

(71) Applicant: International Business Machines Corporation, Armonk, NY (US)

(72) Inventors: Martin J. C. Presler-Marshall, Chapel Hill, NC (US); Hunter K. Presnall, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 75 days.

(21) Appl. No.: 13/719,294

(22) Filed: Dec. 19, 2012

(65) Prior Publication Data

US 2014/0171050 A1 Jun. 19, 2014

(51) Int. Cl.
 *H04M 3/42* (2006.01)
 *H04M 3/54* (2006.01)
(52) U.S. Cl.
 CPC .......... *H04M 3/541* (2013.01); *H04M 3/42357* (2013.01)
(58) Field of Classification Search
 CPC .................... H04M 3/42357; H04M 3/541
 USPC ........................................................ 455/417
 See application file for complete search history.

(56) References Cited

U.S. PATENT DOCUMENTS

| | | | |
|---|---|---|---|
| 6,584,316 B1 | 6/2003 | Akhteruzzaman et al. | |
| 7,013,003 B2 * | 3/2006 | Seligmann | 379/211.02 |
| 7,664,510 B1 | 2/2010 | Contractor | |
| 7,869,792 B1 * | 1/2011 | Zhou et al. | 455/411 |
| 8,068,854 B2 | 11/2011 | Contractor | |
| 8,224,306 B2 | 7/2012 | Allen et al. | |
| 2004/0174976 A1 * | 9/2004 | Elliott | H04Q 3/005 379/211.01 |
| 2007/0286384 A1 * | 12/2007 | Christensen et al. | 379/201.07 |
| 2009/0086947 A1 * | 4/2009 | Vendrow | 379/201.12 |
| 2009/0136015 A1 * | 5/2009 | Roberts | 379/210.02 |
| 2010/0316205 A1 * | 12/2010 | Zheng et al. | 379/142.1 |
| 2011/0261937 A1 * | 10/2011 | Chmara et al. | 379/142.01 |
| 2012/0099719 A1 * | 4/2012 | Erb | 379/211.01 |
| 2014/0162665 A1 * | 6/2014 | Vendrow | H04M 3/42374 455/445 |

OTHER PUBLICATIONS

"Using Unified Communications to Eliminate I'm in room xyz, do you want to join me?", IP.com Prior Art Database, Technical Disclosure IPCOM000219183D, Jun. 25, 2012, 3 pgs.

* cited by examiner

*Primary Examiner* — Timothy Pham
(74) *Attorney, Agent, or Firm* — Cuenot, Forsythe & Kim, LLC

(57) ABSTRACT

Call processing can include receiving a call directed to a first destination device associated with a called party, determining, using a processor, an attribute of the call, and determining a location of the called party. A call processing rule can be selected that matches the attribute of the call and the location of the called party. The call can be redirected to a second and different destination device according to the matched call processing rule.

14 Claims, 3 Drawing Sheets

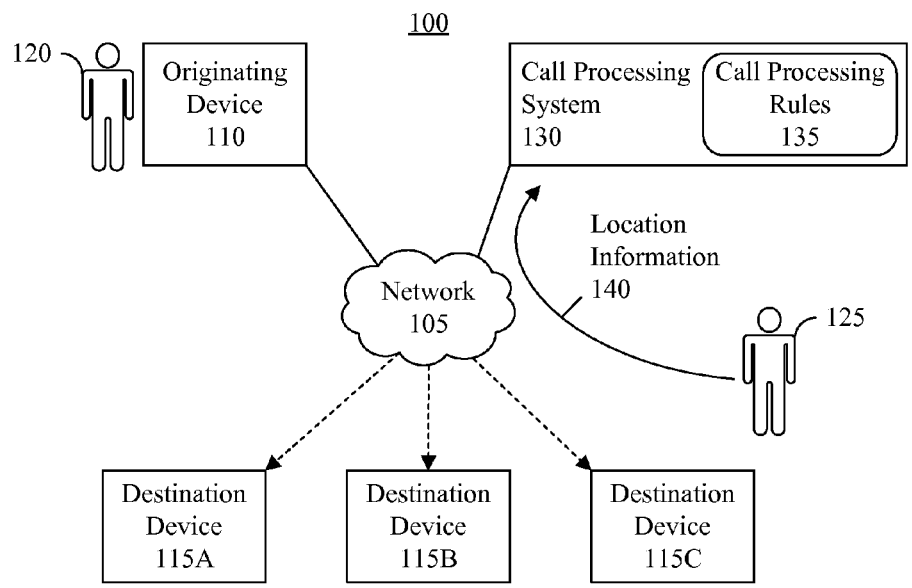

| Rule | Called Party Identity | Called Party Location | Call Attributes | Destination |
|---|---|---|---|---|
| 1 | John Smith | Office | Calling number = 012-345-6789 | Mobile Number |
| 2 | John Smith | Office | Calling number = 123-456-7890 | Office Number |
| 3 | John Smith | Home | Calling number = 123-456-7890 | Mobile Number |
| 4 | John Smith | Home | Work contact | Mobile Number |
| 5 | John Smith | Home | Personal Contact | Home Number |
| 6 | John Smith | Other | Work contact, additional call transfer options | Mobile Number |

FIG. 2

UNIFIED COMMUNICATIONS USING CALLED PARTY LOCATION

BACKGROUND

Call forwarding refers to a feature in which an incoming call to a first destination is redirected to a second or different destination. For example, one may wish to have calls to one's home telephone forwarded, e.g., redirected, to one's mobile phone. In this example, once activated, call forwarding causes a call to one's home, e.g., the first destination, to be redirected to one's mobile phone, i.e., the second destination. Typically, the destination to which a call is redirected is static. As such, calls are forwarded to the second number until the feature is turned off or a different destination is specified by the person receiving the calls.

BRIEF SUMMARY

A method includes receiving a call directed to a first destination device associated with a called party, determining, using a processor, an attribute of the call, and determining a location of the called party. The method further includes selecting, using the processor, a call processing rule matching the attribute of the call and the location of the called party and redirecting the call to a second and different destination device according to the matched call processing rule.

A system includes a processor programmed to initiate executable operations. The executable operations include receiving a call directed to a first destination device associated with a called party, determining an attribute of the call, and determining a location of the called party. The executable operations further include selecting a call processing rule matching the attribute of the call and the location of the called party and redirecting the call to a second and different destination device according to the matched call processing rule.

A computer program product for call processing includes a computer readable storage medium having program code stored thereon. The program code is executable by a processor to perform a method. The method includes receiving, using the processor, a call directed to a first destination device associated with a called party, determining, using the processor, an attribute of the call, and determining, using the processor, a location of the called party. The method further includes selecting, using the processor, a call processing rule matching the attribute of the call and the location of the called party and redirecting, using the processor, the call to a second and different destination device according to the matched call processing rule.

BRIEF DESCRIPTION OF THE SEVERAL VIEWS OF THE DRAWINGS

FIG. 1 is a block diagram illustrating an example of a communication system.

FIG. 2 is a table illustrating examples of call processing rules.

DETAILED DESCRIPTION

Figure 3:
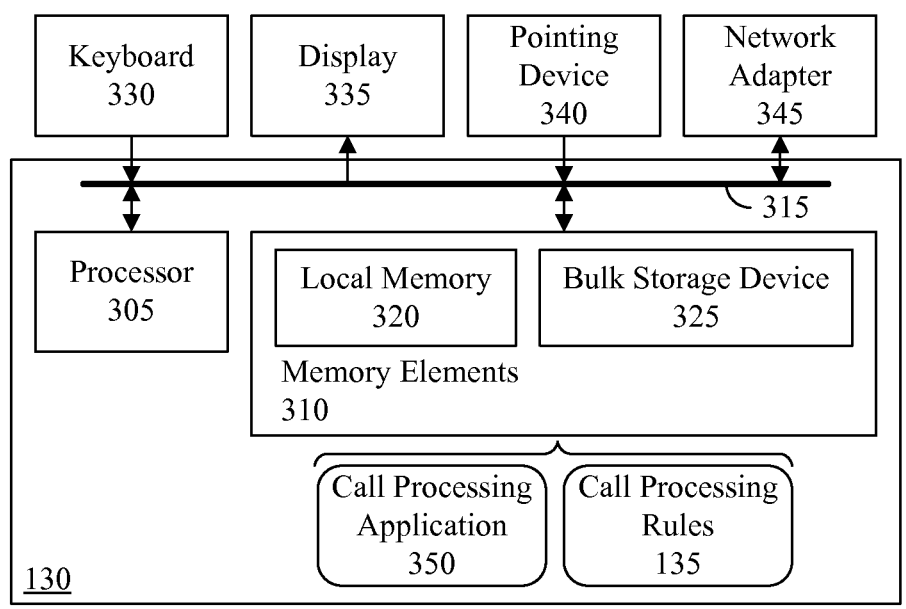
FIG. 3 is an exemplary implementation of the call processing system of FIG. 1.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

One or more embodiments disclosed within this specification relate to call processing and, more particularly, to redirecting a call based upon call processing rules that utilize the location of a called party. In accordance with the inventive arrangements disclosed within this specification, a call from a calling party directed to a called party can be selectively redirected based upon various call processing rules specified by the called party. The call processing rules are location dependent in that the particular call processing rule that is selected and implemented is chosen according to the location of the called party at the time that the call is placed and/or is being redirected.

FIG. 1 is a block diagram illustrating an example of a communication system 100. Communication system 100, as shown, includes a network 105 through which a plurality of different devices are communicatively linked. In one aspect, network 105 can be implemented as, or include, any of a variety of different networks such the Public Switched Telephone Network (PSTN), a WAN, a LAN, a wireless network, a mobile network, a Virtual Private Network (VPN), the Internet, other public and/or private networks and/or various combinations of the foregoing.

As shown, an originating device 110 is communicatively linked to network 105 as is each of destination devices 115A, 115B, and 115C. Destination devices 115A-115C are collectively referred to as destination device 115. Each of originating device 110 and destination devices 115 is implemented as a device or system that can initiate, conduct, and receive telephone calls or simply "calls." A "call" is a voice communication session between two or more endpoints, e.g., originating device 110 and a destination device 115A, 115B, or 115C. A call can be a conventional telephone call carried, at least in part, over the PSTN, a Voice Over Internet Protocol (VOIP) call or other packet-switched voice communication session, a mobile phone call, a combination of two or more of the foregoing, etc.

Examples of originating device 110 and destination devices 115 include a telephone, whether analog, digital, or packet switched, a mobile phone, a data processing system (e.g., computer, laptop, tablet, etc.) executing suitable operational and communication application software, or the like. Each of originating device 110, destination device 115A, destination device 115B, and destination device 115C can be associated with a unique telephone number or other network address (hereafter "number") to which a call can be directed.

A calling party, i.e., a human being, 120 is associated with originating device 110. A called party 125 is associated with each of destination devices 115A, 115B, and 115C. In one aspect, each of destination devices 115A-115C is located at a different physical location. For example, destination device 115A is located at the office of called party 125. Destination 115B is located at the home of called party 125. Destination device 115C is a mobile phone of called party 125.

Call processing system 130 is a data processing system that is communicatively linked to network 105. Call processing system 130 can be communicatively linked to network 105 through any of a variety of intermediary networks, interfaces, and/or switching nodes as may be required. As shown, call processing system 130 includes one or more call processing rules 135.

In one aspect, each of call processing rules 135 is location dependent. More particularly, each of call processing rules 135 is applicable and, as such, executed, based upon the location of the called party. Accordingly, call processing system 130 is generally programmed or configured to receive and/or intercept calls, apply one or more of call processing rules 135 to the call, and optionally redirect the call as may be required by execution of applicable call processing rules 135.

In operation, calling party 120, using originating device 110, initiates a call to called party 125. The call is received, e.g., intercepted, by call processing system 130. Call processing system 130 determines the particular called party to which the call is directed. For example, call processing system 130 can access a database of numbers, where each number is associated with a user, e.g., a called or calling party as the case may be. Having determined the called party for the call, call processing system 130 determines and/or obtains location information 140 for called party 125. The location information specifies the current location of called party 125.

Location information 140 can be specified in any of a variety of different formats whether as an address, a longitude and latitude (e.g., Global Positioning System coordinates), or the like. Further, location information 140 can be determined by any of a variety of different techniques. In one aspect, location information 140 is obtained using a Global Positioning System (GPS) receiver worn by, or with, called party 125 that allows the location of called party 125 to be determined and provided to call processing system 130. For example, a mobile phone includes a GPS receiver.

In another aspect, location information 140 is determined by called party 125 having a presence or being logged into a particular system and/or using a particular client. For example, called party 125 may be logged into a communication system such as an instant messaging system and/or an electronic mail system. The particular client through which called party 125 logs in can be identified. If the client is associated with a particular location, the location of called party 125 can be presumed to be the same as the particular client through which called party 125 logged into the communication system.

In another aspect, location information 140 is determined by evaluating badge, scanner, and/or card reader data that may be obtained as called party 125 enters and/or leaves particular rooms of a building or other monitored structure. Such information can be reported back to call processing system 130.

In still another aspect, one or more other triangulation methods can be used. Further, call processing system 130 can be provided with access to a calendar of called party 125. The calendar can specify location information for called party 125 by way of indicating scheduled meetings and meeting locations, whether called party 125 is working from home, on a customer site, etc. for the day or for particular times during the day.

In any case, having received the call from originating device 110, call processing system 130 can search call processing rules 135 for one or more applicable call processing rules. In one aspect, call processing system 130 searches for call processing rules 135 that match one or more attributes of the particular call that was received and the location of called party 125. In doing so, the particular set or subset of call processing rules 135 that are searched also can be limited to those applicable to called party 125. Call processing system 130 can select the matching call processing rule and execute the selected call processing rule. Accordingly, the call from calling party 120 is redirected in accordance with the matched one or more of call processing rules 135.

FIG. 2 is a table illustrating examples of call processing rules 135. For purposes of illustration, six different call processing rules are illustrated for a particular called party named, or having the identity of, "John Smith." Each of the call processing rules is specific to a particular party, e.g., John Smith, as opposed to a particular dialed number and, as such, destination device of the called party.

Regarding call processing rule 1, when a call is directed to John Smith (e.g., any number associated with John Smith) while John Smith is located at the office and the calling number is "0123456789," the call is redirected to the mobile number associated with John Smith. The call can be redirected regardless of the originally dialed number for the call. If the originally dialed number was the mobile number for John Smith, then no redirection is necessary.

Regarding call processing rule 2, when a call is directed to John Smith while John Smith is located at the office and the calling number is "1234567890," the call is redirected to the office number for John Smith. The call can be redirected regardless of the originally dialed number for the call. For example, a call to the mobile phone of John Smith that matches call processing rule 2 is redirected to the office of John Smith. If the originally dialed number was the office number for John Smith, then no redirection is necessary.

Regarding call processing rule 3, when a call is directed to John Smith while John Smith is located at home and the calling number is "1234567890," the call is redirected to the mobile number for John Smith. The call can be redirected regardless of the originally dialed number for the call. If the originally dialed number was the mobile number for John Smith, then no redirection is necessary.

Call processing rules 2 and 3 illustrate the variability that is available when incorporating location into the call processing rules. In the case of call processing rules 2 and 3, the incoming call is redirected to a different location when the only difference between the two is the location of the called party.

Regarding call processing rule 4, when a call is directed to John Smith while John Smith is located at home and the calling number is associated with a work contact, the call is redirected to the mobile number for John Smith. The call can be redirected regardless of the originally dialed number for the call. If the originally dialed number was the mobile number for John Smith, then no redirection is necessary.

Regarding call processing rule 5, when a call is directed to John Smith while John Smith is located at home and the calling number is associated with a personal contact, the call is redirected to the home number for John Smith. The call can be redirected regardless of the originally dialed number for the call. If the originally dialed number was the home number for John Smith, then no redirection is necessary.

Regarding call processing rule 6, when a call is directed to John Smith while John Smith is located at an unspecified location or one other than the office or home, and the calling number is associated with a work contact, the call is redirected to the mobile number for John Smith. The call can be redirected regardless of the originally dialed number for the call. If the originally dialed number was the mobile number for John Smith, then no redirection is necessary.

In the case of processing rule 6, additional call transfer options are specified that indicate special handling for the call. In one aspect, when the called party answers, the call processing system can present the called party with one or more additional call transfer options from which the called party may select. In one example, the called party may be located on premises at an alternate business location where many other destination devices are available. In that case, the call processing system can present the called party with one or more different options for transferring the call to another destination device such as another nearby destination device.

While not explicitly illustrated, in another aspect, the call attributes column can include a time or time span. In that case, for the call processing rule to be applicable, the call would need to arrive at the call processing system within the time span specified within the call processing rule. As an example, a time span of 3:00 pm to 4:00 pm can be added to call processing rule 4. Thus, call processing rule 4 is only applied when all attributes of the call match those specified and the user is located in the location specified in the call processing rule.

FIG. 3 is an exemplary implementation of call processing system 130 of FIG. 1. Call processing system 130 includes at least one processor (e.g., a central processing unit) 305 coupled to memory elements 310 through a system bus 315 or other suitable circuitry. As such, call processing system 130 can store program code within memory elements 310. Processor 305 executes the program code accessed from memory elements 310 via system bus 315. In one aspect, for example, call processing system 130 is implemented as a computer or other programmable data processing apparatus that is suitable for storing and/or executing program code. It should be appreciated, however, that call processing system 130 can be implemented in the form of any system including a processor and memory that is capable of performing and/or initiating the functions and/or operations described within this specification. For example, call processing system 130 can be implemented as a telephone switch having a processor and memory.

Memory elements 310 include one or more physical memory devices such as, for example, local memory 320 and one or more bulk storage devices 325. Local memory 320 refers to RAM or other non-persistent memory device(s) generally used during actual execution of the program code. Bulk storage device(s) 325 can be implemented as a hard disk drive (HDD), solid state drive (SSD), or other persistent data storage device. Call processing system 130 also can include one or more cache memories (not shown) that provide temporary storage of at least some program code in order to reduce the number of times program code must be retrieved from bulk storage device 325 during execution.

Input/output (I/O) devices such as a keyboard 330, a display 335, and a pointing device 340 optionally can be coupled to call processing system 130. The I/O devices can be coupled to call processing system 130 either directly or through intervening I/O controllers. One or more network adapters 345 also can be coupled to call processing system 130 to enable call processing system 130 to become coupled to other systems, computer systems, remote printers, telephony switches, text-to-speech systems, speech recognition systems, and/or remote storage devices through intervening private or public networks. Modems, cable modems, and Ethernet cards are examples of different types of network adapters 345 that can be used with call processing system 130.

As pictured in FIG. 3, memory elements 310 can store a call processing application 350 and call processing rules 135. Call processing application 350 and call processing rules 135, being implemented in the form of executable program code, can be executed by call processing system 130 and, as such, are considered an integrated part of call processing system 130. Call processing system 130 is programmed to perform and/or initiate the various operations and/or functions described within this specification. Moreover, call processing application 350, call processing rules 135, and the various items of information upon which call processing system 130 operates are functional data structures that impart functionality when employed as part of call processing system 130.

Figure 4:
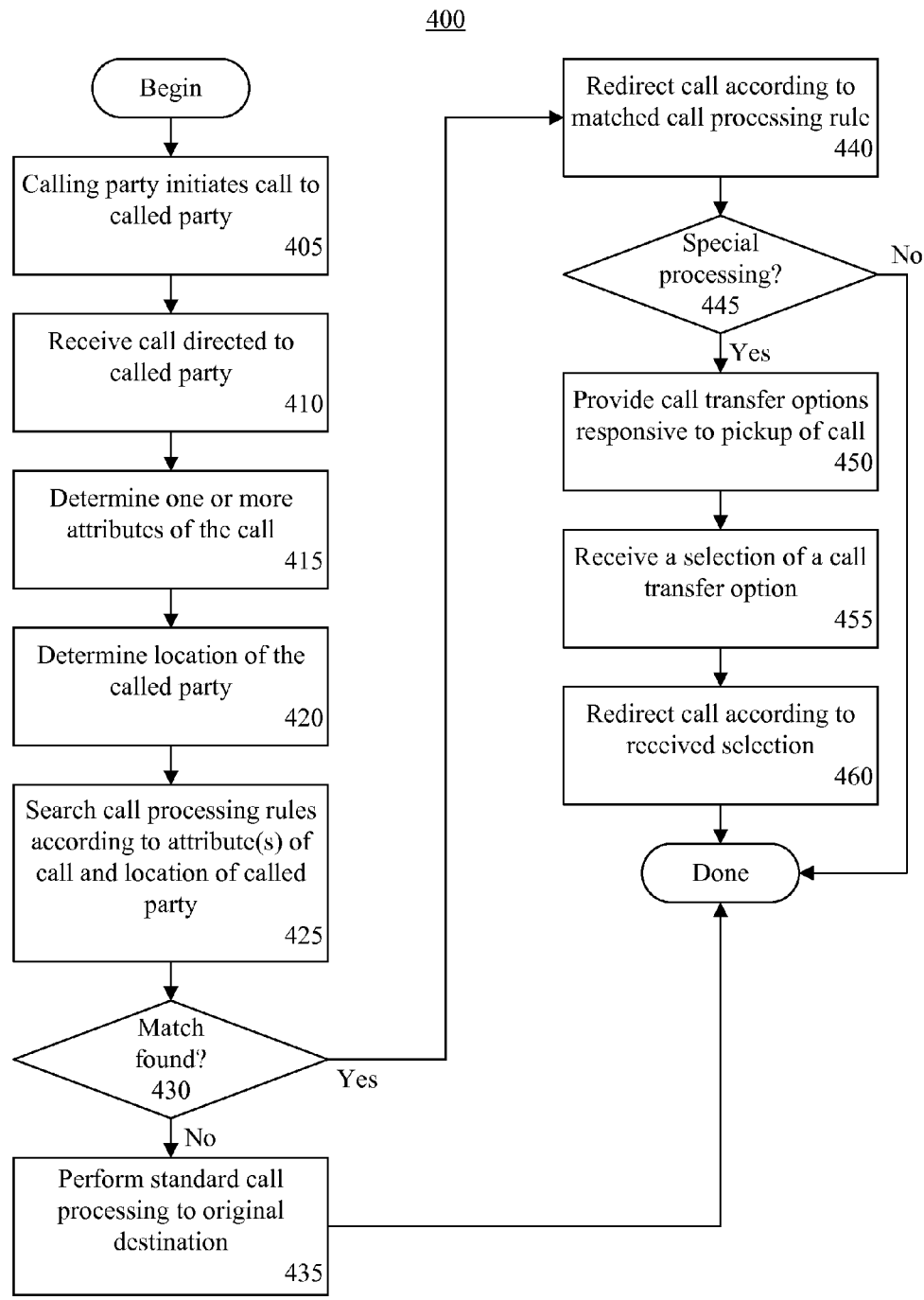
FIG. 4 is a flow chart illustrating an exemplary method of call processing.

FIG. 4 is a flow chart illustrating an exemplary method 400 of call processing. Method 400 can be performed by a system such as call processing system 130 as described with reference to FIGS. 1-3 of this specification.

Method 400 can begin in block 405, where a calling party initiates a call to a called party. In block 410, the system receives, or intercepts, the call directed to the called party. In one example, the system intercepts any call directed to a called party that has specified one or more call processing rules as described within this specification.

In block 415, the system determines one or more attributes of the call. As discussed, the system can determine attributes of the call including, but not limited to, the number of the calling party or originating device, the time of the call, the number of the called party initially dialed, etc. In block 420, the system determines the location of the called party. For example, the system can query a location determination system, receive location information from a location determination system from time-to-time, periodically, or the like.

In block 425, the system searches the call processing rules according to the attributes of the call and the location of the called party. It should be appreciated that the particular call processing rules that are searched can be filtered or limited only to those call processing rules associated with the called party. For example, searching the call processing rules can include first identifying a set of call processing rules associated with the called party. The call processing rule matching the attribute(s) of the call and the location of the called party can be selected from the set of call processing rules associated with the called party. The attributes of the call processing rules that are matched can include the calling party or origination number for the call, the classification of that number as belonging to a particular group such as "personal," "work," etc., time (time span), etc. In block 430, the system determines whether a match was found. If so, method 400 proceeds to block 440. If not, method 400 continues to block 435.

Continuing with block 435, in the case that no matching call processing rule was found, the system performs standard call processing. In this example, the call is directed, or connected, to the originally specified destination device, or dialed number. After block 435, method 400 can end.

In block 440, in the case where a matching call processing rule is found, the call received in block 410 is redirected according to the matched call processing rule. Accordingly, the call is redirected from a first destination device to a second and different destination device as specified in the matched call processing rule. As noted in describing FIG. 2, in some cases, redirection is not required as the destination number specified by the call processing rule is the same as the number originally dialed by the calling party. After block 440, method 400 proceeds to block 445.

In block 445, the system determines whether the call processing rule indicates any special processing. Special processing includes providing the called party with one or more additional call transfer options as described with reference to call processing rule 6 of FIG. 2. In one example, special processing can be limited to cases in which the destination device specified by the call processing rule is a mobile device of the called party. If no special handling is indicated by the matched call processing rule, method 400 can end.

If special handling is indicated by the matched call processing rule, method 400 continues to block 450. If not, method 400 can end. In block 450, the system provides one or more call transfer options to the called party. For example, responsive to the called party picking up, or answering the incoming call, one or more call transfer options can be played to the called party over the call using an automated attendant, e.g., text-to-speech and/or prerecorded messages. The call transfer options are provided to the called party prior to establishing a connection, e.g., a voice link, between the calling party (originating device) and the called party (the second destination device or first destination device if no redirection was required). For example, the calling party can remain on hold or in a waiting state while the call transfer options are presented or played to the called party.

In block 455, the system can receive a selection of a call transfer option from the called party. The selection can be made by pressing a key of the particular destination device used by the called party or by voice. In block 460, responsive to receiving the selection from the called party, the system redirects the call from the second destination device to the particular destination device specified by the called party. In one aspect, the destination device selected as a call transfer option is a third and different destination device. It should be appreciated that in the case where the call processing rule specified a same number as originally dialed, the call is transferred to a second and different destination device.

In another aspect, the destination device can be the same destination device over which the user made the call transfer selection, e.g., effectively choosing not to exercise special processing.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A system comprising:
   a processor programmed to initiate executable operations comprising:
   receiving a call directed to a first destination device associated with a called party;
   determining an attribute of the call;
   determining a location of the called party;
   selecting a call processing rule matching the attribute of the call and the location of the called party; and
   redirecting the call to a second and different destination device according to the matched call processing rule, wherein
   the call processing rule indicates that the called party is to be prompted upon pickup of the call at the second destination device, wherein
   the processor is further programmed to initiate executable operations comprising:
   responsive to a pickup of the call at the second destination device, providing at least a third destination device as a call transfer option prior to connecting the called party with a calling party of the call;
   receiving a selection of a provided call transfer option; and
   processing the call according to the selection.

2. The system of claim 1, wherein
   the attribute of the call is a number of a device from which the call originated.

3. The system of claim 1, wherein
   the attribute of the call is a time of the call.

4. The system of claim 1, wherein
   selecting a call processing rule matching the attribute of the call and the location of the called party comprises:
   first identifying a set of call processing rules associated with the called party; and
   selecting the call processing rule matching the attribute of the call and the location of the called party from the set of call processing rules associated with the called party.

5. The system of claim 1, wherein
   the call remains at the second destination device.

6. The system of claim 1, wherein
   the call is further redirected to the third destination device specified by the selection.

7. The system of claim 1, wherein
   the call processing rule only permits the providing at least a third destination device as a call transfer option when the second destination device is a mobile device.

8. A computer program product for call processing, the computer program product comprising a computer readable storage medium having program code stored thereon, the program code executable by a processor to perform a method comprising:
   receiving, using the processor, a call directed to a first destination device associated with a called party;
   determining, using the processor, an attribute of the call;
   determining, using the processor, a location of the called party;
   selecting, using the processor, a call processing rule matching the attribute of the call and the location of the called party; and redirecting, using the processor, the call to a second and different destination device according to the matched call processing rule, wherein the call processing rule indicates that the called party is to be prompted upon pickup of the call at the second destination device, the method further comprising:

responsive to a pickup of the call at the second destination device, providing at least a third destination device as a call transfer option prior to connecting the called party with a calling party of the call;

receiving a selection of a provided call transfer option; and processing the call according to the selection.

9. The computer program product of claim 8, wherein the attribute of the call is a number of a device from which the call originated.

10. The computer program product of claim 8, wherein the attribute of the call is a time of the call.

11. The computer program product of claim 8, wherein selecting a call processing rule matching the attribute of the call and the location of the called party comprises:

first identifying a set of call processing rules associated with the called party; and selecting the call processing rule matching the attribute of the call and the location of the called party from the set of call processing rules associated with the called party.

12. The computer program product of claim 8, wherein the call remains at the second destination device.

13. The computer program product of claim 8, wherein the call is further redirected to the third destination device specified by the selection.

14. The computer program product of claim 8, wherein the call processing rule only permits the providing at least a third destination device as a call transfer option when the second destination device is a mobile device.

* * * * *